Dec. 30, 1969 C. E. MACON ET AL 3,487,375

MULTI-PROGRAM DATA PROCESSOR

Filed June 19, 1967 3 Sheets-Sheet 1

INVENTORS
CHARLES E. MACON
ROBERT S. BARTON
PAUL A. QUANTZ
GEORGE T. SHIMABUKURO
BY Christie, Parker & Hale
ATTORNEYS.

MULTI-PROGRAM DATA PROCESSOR

Filed June 19, 1967 3 Sheets-Sheet 2

INVENTORS.
CHARLES E. MACON
ROBERT S. BARTON
PAUL A. QUANTZ
GEORGE T. SHIMABUKURO
BY Christie, Parker & Hale
ATTORNEYS.

MULTI-PROGRAM DATA PROCESSOR

Filed June 19, 1967 3 Sheets-Sheet 3

INVENTORS.
CHARLES E. MACON
ROBERT S. BARTON
PAUL A. QUANTZ
GEORGE T. SHIMABUKURO
BY Christie, Parker & Hale
ATTORNEYS.

United States Patent Office 3,487,375
Patented Dec. 30, 1969

3,487,375
MULTI-PROGRAM DATA PROCESSOR
Charles E. Macon, Arcadia, Calif., Robert S. Barton, Salt Lake City, Utah, Paul A. Quantz, Scottsdale, Ariz., and George T. Shimabukuro, Monterey Park, Calif., assignors to Burroughs Corporation, Detroit, Mich., a corporation of Michigan
Filed June 19, 1967, Ser. No. 646,986
Int. Cl. G11b *13/00*
U.S. Cl. 340—172.5 12 Claims

ABSTRACT OF THE DISCLOSURE

A data processing system having a digital data processor, a disk file storage system for storing program instructions and data and an electronic program analyzer for providing instructions to the disk file storage system and the data processor. The disk file storage system includes a magnetic core memory system for storing instructions identifying reading and writing operations at designated locations on disk and for making such instructions available, one at a time, as the desired location on disk for such instructions becomes available for reading and writing. A queue of linking instructions waiting to be executed are stored in a memory for the data processor.

CROSS REFERENCE TO RELATED APPLICATIONS

The present invention is directed to the apparatus for forming and using the queue of instructions waiting to be executed. A copending patent application entitled "Data Processing System Having Instruction Conversion Apparatus" filed on the same date as this application and given Ser. No. 646,953 is directed to the program analyzer separately and in combination with the associated data processing system disclosed in the present application. Another copending patent application entitled "Instruction Storage and Retrieval Apparatus for Cyclical Storage Means" filed on the same date as this application and given Ser. No. 646,923 is directed to the memory system for storing the instructions for the disk file separately and in combination with the associated data processing system.

BACKGROUND OF INVENTION

The present invention relates to digital data processing systems and more particularly to data processing system employing improved apparatus for performing multiprogramming.

A new organization in data processing systems is disclosed in the above-identified copending patent applications wherein the data processing system is basically oriented around a bulk storage system. Primary instructions as to the operation to be performed in the bulk storage system are stored in the bulk storage system. These instructions are linked together by addresses in the instructions. The instructions are read from the bulk storage system and a program analyzer converts the instructions into instructions of two different formats, one being for control of reading and writing in the bulk storage system to transfer data to and from a data processor and the other for control of the operations of the data processor on the data.

The program analyzer provides the instructions to the data processor and bulk storage systems at its own pace and asynchronously with the operation of these other devices. Similarly, the bulk storage system operates asynchronously to the data processor in the sense that each executes its respective instructions at its own pace as it gets ready to do so. Therefore, a way of storing the instructions is needed so that the instructions can be obtained and executed as needed by the bulk storage system and the data processor.

SUMMARY OF THE INVENTION

Briefly, a multi-program data processing system embodying the present invention includes an addressable memory having a plurality of queues of instructions which are waiting to be executed. Each of the instructions is stored in a separate memory location together with a link address which serially links an instruction to another in the respective queue. A data processing means executes a current instruction which includes a head address and a tail address of a queue. The memory is addressed with the tail address of a current instruction causing the last instruction in the corresponding queue to be read out and then rewritten. A new address is placed into the last instruction which is rewritten into memory and thereby provide a link to a new tail address. A new instruction is written into the memory location identified by the new address thereby adding the new instruction to the end of the corresponding queue. The tail address in the current instruction is replaced with the new address, thereby providing a link to the end of the corresponding queue.

These and other aspects of the present invention may be more fully understood with reference to the following description of an embodiment of the present invention.

BRIEF DESCRIPTION OF THE DRAWINGS

FIG. 3 also shows the data processor 100 of FIG. 1 again, together with the working memory and registers which are used with the queue control.

DESCRIPTION OF THE PREFERRED EMBODIMENT

Figures 1, 2:
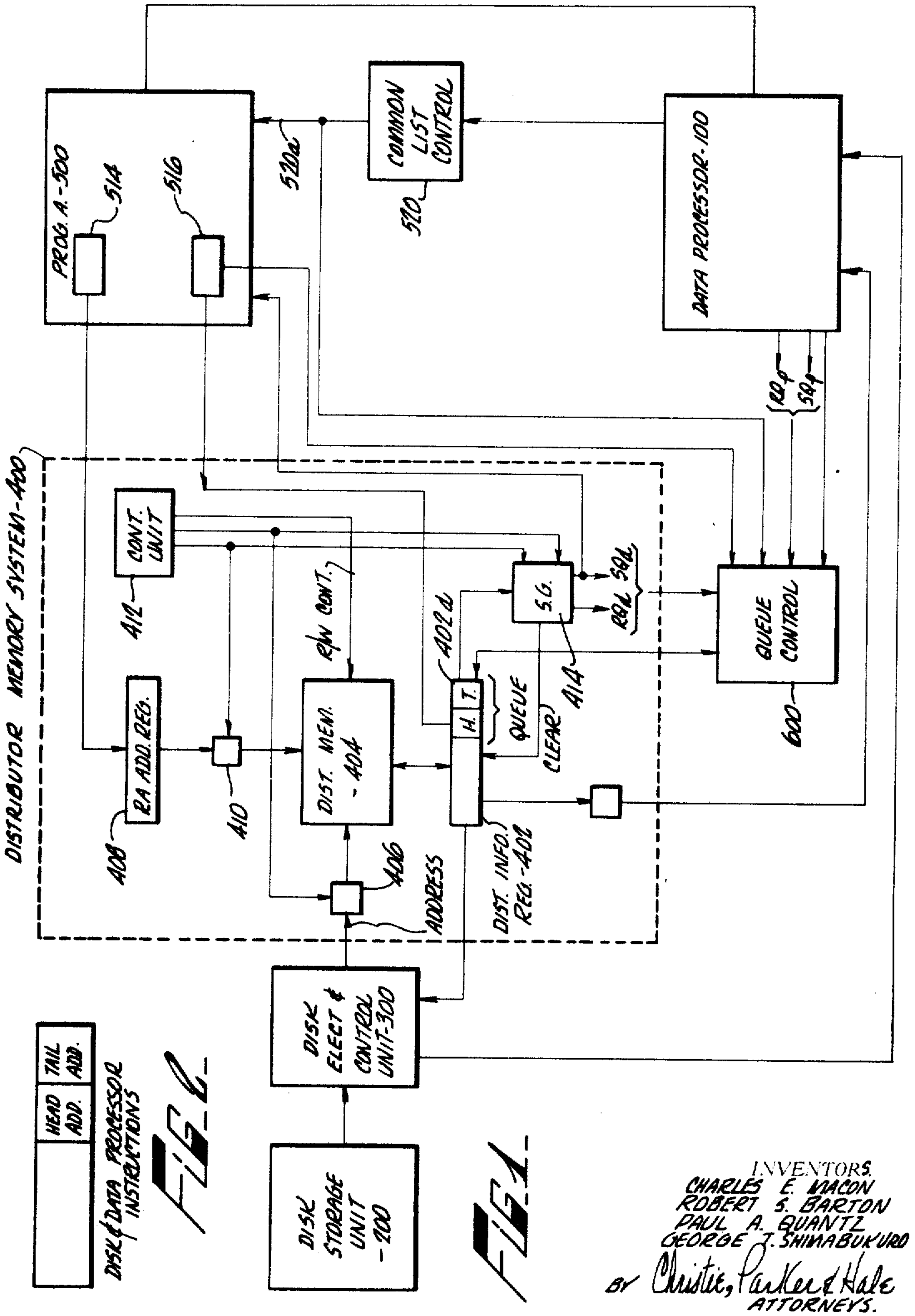
FIG. 1 is a block diagram of a data processing system and embodies the present invention.
FIG. 2 is a sketch illustrating the parts of the instructions used in the system of FIG. 1 which are pertinent to the present invention.

Refer now to the block diagram of FIG. 1. A data processor 100 is provided for executing instructions on data stored in the disk storage unit 200. A program analyzer 500 receives what are called "primary instructions" obtained from the disk storage unit 200 and converts such primary instructions into data processor instructions for execution by the data processor 100 and into disk file instructions for execution by the bulk storage apparatus. The bulk storage apparatus includes the disk storage unit 200, the disk electronic and control unit 300 and the distributor memory system 400. The bulk storage apparatus executes the disk file instructions in order to cause information to be read out of and written into the disk storage unit 200.

The disk storage unit 200 has a magnetic recording disk in which information is read and written. The disk is divided into angular positions (or sectors) and tracks. The disk is addressed by an angular position number (or sector number) and a track number.

A queue 600 is used to take instructions which cannot presently be executed by the bulk storage apparatus or the data processor and store them into a working memory (shown in FIG. 3) of the data processor 100. The instructions stored in the working memory by the queue 600 are the disk file instructions and the data processor instructions. The instructions stored in the working memory by the queue 600 are stored on a first in, first out type of arrangement so that the last instruction stored in the memory is obtained last for execution.

The instructions are stored in separate queues in accordance with the type of instruction. For example, each different program in the data processor will have a separate queue of instructions and all of the instructions within one queue are linked together by linking addresses. Also, each disk file instruction which is formed is to be used to read or write at a particular angular position of a disk in the disk storage unit 200. Accordingly, a separate queue of disk file instructions is formed for each angular position on the disk.

Consider the operation of the distributor memory system 400 in combination with the disk storage unit 200 and the electronic and control unit 300. Briefly, the distributor memory 400 has a memory 404 with a memory storage location or slot for each angular position on a disk in the disk storage unit 200. Each memory location stores an instruction for control of reading and writing at the corresponding angular position of the disk in the disk storage unit 200. The control unit 412 causes the memory location of the distributor memory 404 which is addressed by the disk electronic and control unit 300 to be read out and stored in the information register 402 and then to be rewritten. The distributor memory 404 is a conventional magnetic core memory well known in the computer art.

The disk electronic and control unit 300 provides a unique address signal corresponding to each angular position as it becomes available for reading and writing on the disk. The distributor memory system 400 has a gate 406 which couples the addresses to the distributor memory 404. The distributor memory 404 reads out the content of the particular storage location therein as the corresponding angular position becomes available on disk for reading and writing and as the corresponding address is formed by the disk electronic and control unit 300. The instruction is read out and stored in the information register 402 where it is applied to the disk electronic and control unit 300 for control of the reading and writing in the corresponding angular position of the disk as it becomes available. If no disk instruction is stored in a particular memory location of the distributor memory 400 no reading or writing operation takes place in the disk storage unit at the corresponding angular position. The information read and written in the disk storage unit 200 includes the program instructions, the data and the results of arithmetic operations by the data processor 100.

Consider the structure of apparatus for storing new instructions into the distributor memory. A random access address register 408 is used to address the distributor memory 404 when a new disk file instruction is to be stored into the distributor memory 404. The program analyzer 500 has a primary instruction register 514 and a disk instruction register 516. The disk instruction register 516 stores the disk file instructions as they are formed and the primary instruction register 514 stores the corresponding angular position numbers for the disk. The angular position number is used to identify an address in the distributor memory 404 where the disk file instruction contained in register 516 is to be stored. The program analyzer 500 stores the angular position number into the random access address register 408 and stores the disk file instruction into the distributor memory information register 402. The control unit 412 causes a gate 410 to couple the address contained in the random access address register 408 to the distributor memory 404. At the same time, the control unit 412 also causes the gate 406 to remove the address signals provided by the disk electronic and control unit 300. The distributor memory 404 then stores the disk file instruction contained in register 402 into the memory location of the distributor memory 404 identified by the content of the angular position number stored in the register 408 under control of the control unit 412.

FIG. 2 is a sketch which illustrates the format of the disk file instructions and the data processor instructions. At the left end of the instruction shown in FIG. 2, information is placed depending on the type of instruction. At the right end of the instructions as shown in FIG. 2 is a head address and a tail address. The head address is used to identify the top of the corresponding queue. The tail address is used to identify the last instruction in tthe corresponding queue.

Consider generally the operation of the queue control 600 and the way in which information is transferred into the various queues in the memory of the data processor 100 making reference to FIG. 1. First, assume that the program analyzer 500 has formed a new disk file instruction in register 516 and the corresponding angular position number is contained in register 514. The program analyzer 500 stores the angular position number into the random access address register 408. The control unit 412 causes the contents of the corresponding location to be read out and to be stored into the register 402. If a current disk file instruction waiting to be executed is contained in the addressed location the signal generator 414 senses that the current disk file instruction is now stored in the information register 402 and forms a control signal at the SQ*d* output thereof. This signal indicates that the new disk file instruction contained in register 516 must be stored into a queue and cannot be stored into distributor memory 404 because a current instruction has already been stored in the corresponding storage location.

The control signal at SQ*d* causes the queue control 600 to take the new disk file instruction contained in register 516 and store it at the bottom or end of a queue in the memory of the data processor 100. The queue in which the new disk file instruction is added is identified by the tail address of the queue portion of the disk file instruction contained in register 402. The queue control 600 also takes the current disk file instruction stored in register 402 and modifies the tail address thereof so that it points at the new tail of the corresponding queue. The control unit 412 then causes the modified disk file instruction contained in register 402 to be written back into the same memory location of the distributor memory 404 from which it was read and which is still addressed by the content of register 408.

Should a new disk file instruction be formed by the program analyzer 500 for a particular angular position and should the corresponding location in the distributor memory 404 be empty, all zeros are read out of the memory 404 and are stored into the information register 402. Under these conditions the signal generator 414 goes not generate a control signal at SQ*d* and the program analyzer sends the new disk file instruction to the information register 402 causing it to be stored into the correct storage location during the following write operation which always occurs after each read operation.

As a current disk file instruction is read from a particular location in the distributor memory 404 and executed, the queue control 600 provides the next disk file instruction from the corresponding queue to the distributor memory 404 for execution. To this end the control unit 412 applies a signal to the signal generator 414 and causes a control signal to be formed at the output RQ*d* whenever a current instruction is read out from memory and stored in register 402 while gate 406 couples address signals from the electronic and control unit 300 to the distributor memory. The control signal at RQ*d* causes the queue control 600 to obtain the next disk file instruction in the corresponding queue and store such instruction into the information register 402, causing the new disk file instruction to be stored back into the memory location from which the current instruction just executed was obtained. The writing of the new disk file instruction takes place during the write operation which always occurs following a read. The queue from which the new instruction is obtained is identified by a head address contained in the disk file instruction.

If a disk file instruction is read out from an address specified by the disk electronic and control unit 300 and the tail address of the instruction is zero indicating that there is no corresponding queue of instruction, then the signal generator 414 applies a signal to the register 402 causing it to be cleared and all zeros are stored during the following write operation. This way the next time the corresponding storage location is read, all zeros will be read indicating to the signal generator 414 that the particular location is empty and can receive a new disk file instruction from the program analyzer.

The data processor 100 operates with the queue control 600 in a similar manner. There is one queue for each program running in the data processor. Whenever a new instruction in one of the programs being operated by the data processor 100 is to be stored into a queue, a control signal is formed at the SQ*p* output of the data processor 100, causing the new instruction to be stored into the corresponding queue by the queue control 600. Also, if the data processor 100 finishes executing a current instruction and a new instruction is to be read from the corresponding queue, a control signal is formed at the RQ*p* output of the data processor 100, causing a new instruction to be obtained from the top or beginning of the corresponding queue by the queue control 600.

A common list control 520 operates in conjunction with the memory of the data processor 100 to keep a stock or list of available addresses. As the program analyzer 500 and the queue control 600 need new addresses, the common list control 520 provides the available addresses one by one, as needed. Similarly, as the addresses are used up by the program analyzer 500 and the data processor 100, the addresses are placed back into memory by the common list control 520. The details of the common list 520 are not explained herein in detail as they are not needed for an understanding of the present invention. However, a mechanism for providing and maintaining a common list of available memory locations using an address linking technique is described in Patent No. 3,297,999.

Further details of the bulk storage apparatus and program analyzer can be obtained from the above-identified copending patent applications.

Figure 3:
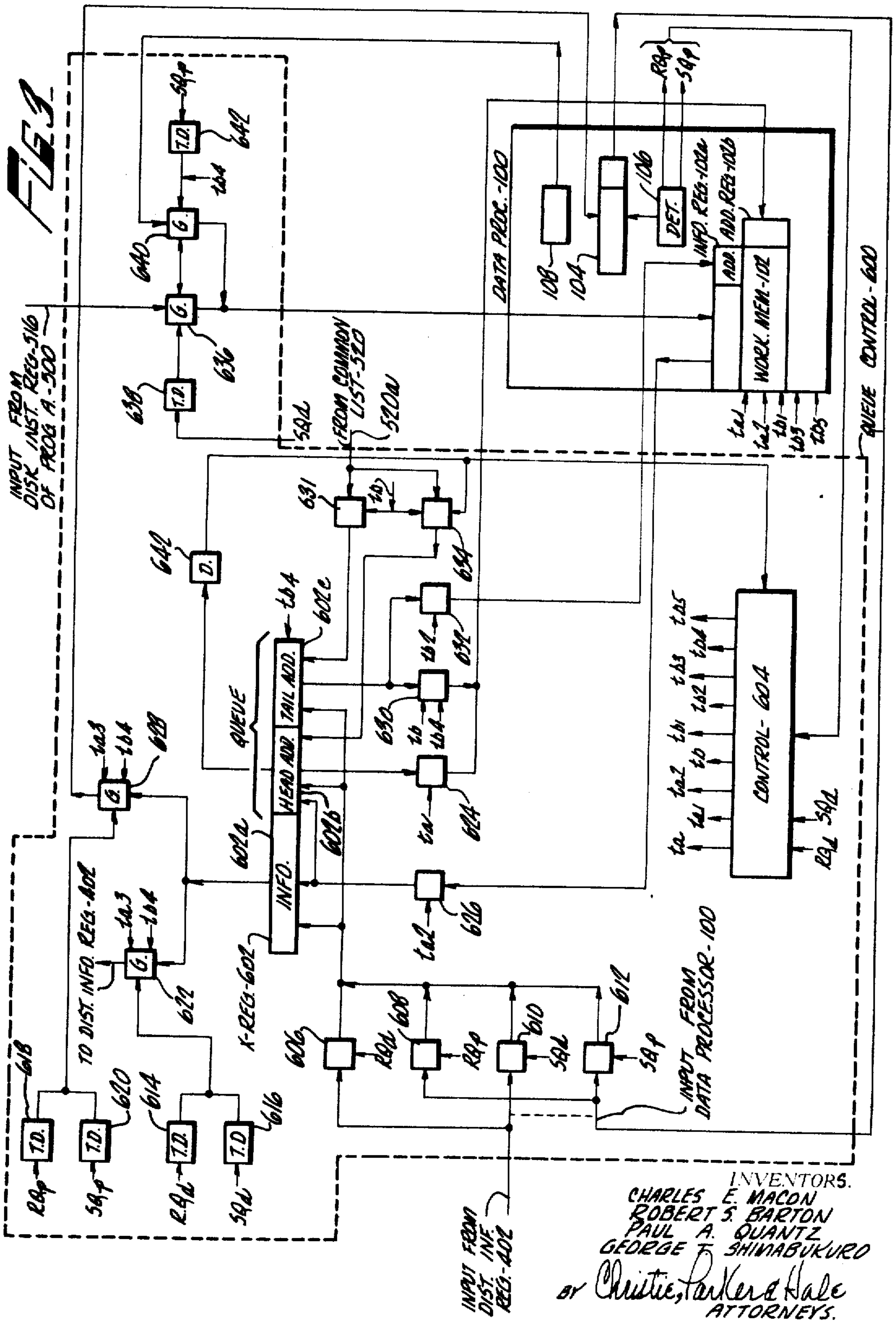
FIG. 3 is a block diagram showing the details of the queue control of FIG. 1.

Consider now the details of the queue control 600, the working memory and the registers of the data processor 100 which communicate with the queue control 600 and which are shown in FIG. 3. The X register 602 receives and stores disk file instructions from the information register 402 of the distributor memory. The head address of such an instruction is stored in section **602*b* of the X register and is used to address the top of the corresponding queue. Also, the X register 602 is used to store a new instruction from the top of the corresponding queue as it is read out from the memory of the data processor. The instruction is stored in the X register after being obtained from the top of the queue and is gated from there back to either the distributor memory information register 402** or back to the data processor, depending on the unit from which the corresponding current instruction was obtained.

The X register 602 is also used to store a current instruction from either the distributor memory 400 or the data processor 100 when a new instruction is to be added to the corresponding queue. Under these conditions the current instruction stored in X register 602 has the tail address thereof stored in section **602*c*. The tail address is used as the address to store the new instruction which is being added to the queue and then a new tail address is stored into section 602*c*** to replace the old tail address of the current instruction. The current instruction is then sent back to the unit from which it was received for execution.

A control circuit 604 is used to form control signals at the output circuits referenced by the symbols *t* followed by other indicia. The control signals formed at these output circuits sequence the operation of the queue control 600.

The data processor 100 is shown again in block form in FIG. 3, for purpose of explanation along with other parts of interest. As indicated, a working memory 102 is provided which has an information register **102*a* and an address register 102*b*. The working memory 102 and its associated information and address registers are a conventional magnetic core type memory commonly used in the computer art. A register 104 is provided in the data processor in which current instructions are stored by the data processor. The register 104 may be considered as a register in the data processor 100 which corresponds to the information register 402 of the distributor memory in the sense that current instructions are stored there. A detector 106** forms a control signal at either an RQ*p* or and SQ*p*. A signal at RQ*p* and SQ*p* indicates that a new instruction either needs to be read out from a queue or that a new instruction needs to be stored into the queue, respectively. A register 108 is provided in the data processor 100 for storing new instructions which are to be added to a queue in the working memory 102. The register 108 can be considered as a register in the data processor 100 which corresponds to the disk instruction register 516 of the program analyzer 500 because the data processor stores new instructions in this register.

Figures 4, 5, 6:
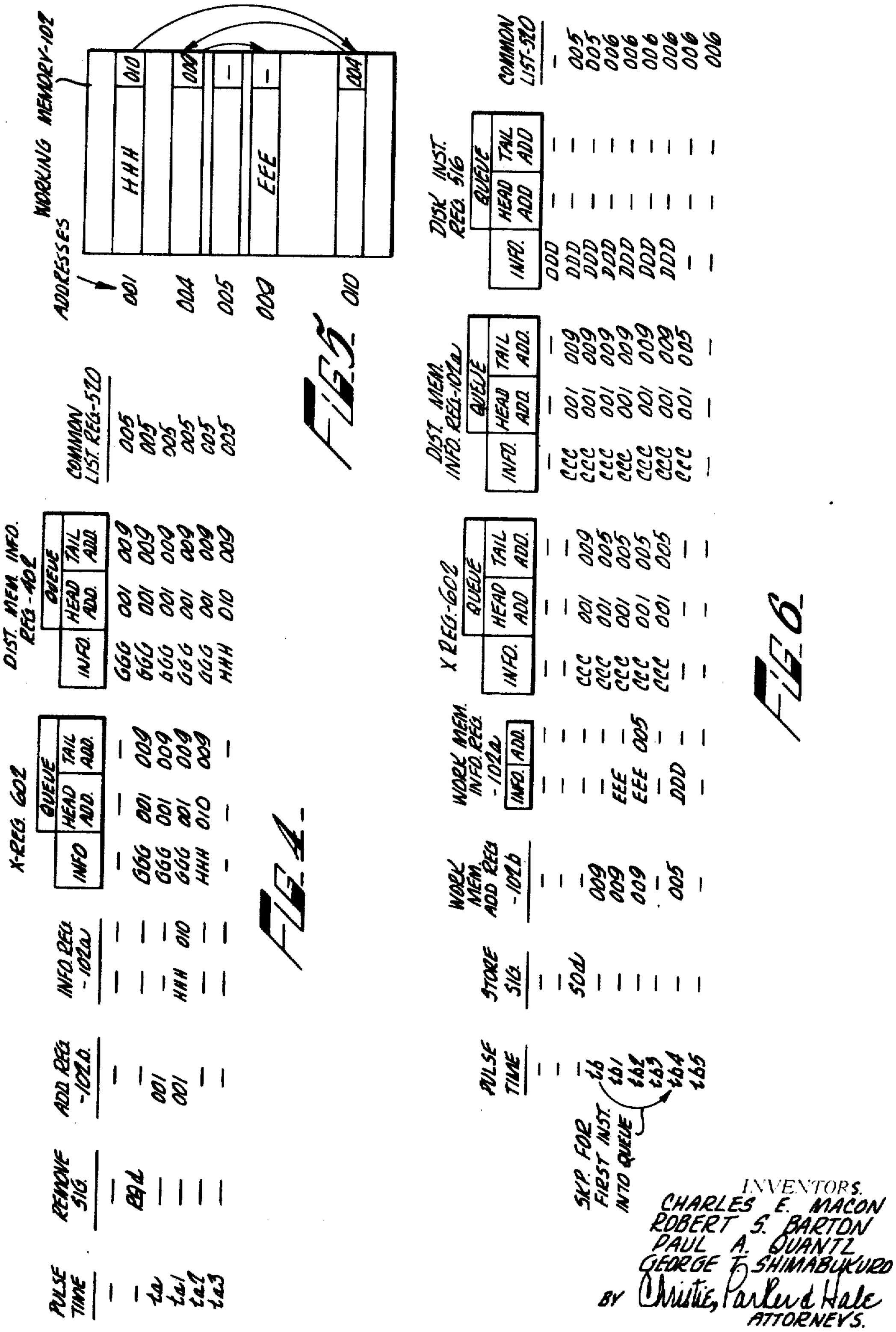
FIG. 4 is a table indicating certain signals and the content of certain registers in order to illustrate an example of the operation of the queue shown in FIG. 4 while reading an instruction out of the queue.
FIG. 5 is a sketch illustrating a queue of instructions in the working memory shown in FIG. 4.
FIG. 6 is a table indicating certain signals and the content of certain registers in order to illustrate an example of the operation of the queue shown in FIG. 4 while storing an instruction into the queue.

Consider now an example of a queue contained in the working memory 102 shown by way of illustration in the sketch of FIG. 5. The queue of instructions is contained in memory locations 001, 004, 005, 009 and 010. Each memory location has a link address stored therein. The top of the queue is contained in address 001 and the bottom of the queue is at memory location 009. Address 001 is linked to the next instruction by link address 010. Similarly, the address 010 is linked to the next instruction by link address 004, and the address 004 is linked to the last instruction by the link address 009. When a new instruction is added to the list, the instruction is placed in a new address and the address of the new address is placed in the address portion of the instruction contained at address 009. When an instruction is taken out of the queue, the first instruction is taken from address 001.

Consider now an example of the operation of the queue control 600 with reference to the table of FIG. 4 which shows certain timing signals and the content of the indicated registers during the operation.

Following the example of FIG. 4, assume initially that the distributor memory information register 402 (see FIG. 1) stores a disk file instruction GGG; 001; 009. Where the first number represents instruction information, the second number is the head address and the third number is the tail address. Also assume that the top of the common list is address 005. Assume now that the signal generator 414 (see FIG. 1) forms a control signal at the RQ*d* output, indicating that a new instruction is to be obtained from the corresponding queue. The control signal at RQ*d* causes a gate 606 to gate the instruction contained in the distributor memory information register 402 into the X register 602. Also, the control signal at RQ*d* causes a time delay circuit 614 to start a timing signal. To be explained, when the time delay circuit 614 times out, it forms a control signal which causes a gate 622 to gate out the content of the X register 602 and store the content into the distributor information register 402.

However, continuing with the operation of the queue control 600 in the sequence with which it operates, the X register 602 now contains the head address 001 and the tail address 009 in 602*b* and 602*c*. With reference to FIG. 5, it can be seen that these are the top and bottom addresses of the queue. The control unit 604 is activated by the control signal at RQ*d* and subsequently forms a control signal at the *ta* output, causing the head address contained in 602*b* to be stored into the address register 102*b* of the working memory by a gate 624.

Control unit 604 then forms a control signal at the *ta*1 output, causing the working memory 102 to read out the content of memory location 001 into the information register 102*a*. With reference to FIG. 4, it will be seen that this new instruction contains information referenced by the symbols HHH and the link address 010.

The control unit 604 then forms a control signal at *ta*2 which causes the new instruction contained in the information register 102*a* to be stored into the X register 602 by a gate 626. With reference to FIG. 4, it will be seen that the new instruction is stored so that the link address 010 now becomes the head address and the tail address 009 of the former instruction becomes the tail address of the new instruction.

The control unit 604 then forms a control signal at *ta*3 and at the same time the time delay circuit 614 times out and the signal from the time delay circuit 614 in coincidence with the control signal at *ta*3 causes the gate 622 to store the new instruction from the X register 602 into the distributor information register 402 for storage as explained hereinabove.

At this point, the top of the queue is 010, as indicated by the head address in the instruction stored in the distributor memory information register 402 and the tail address is still the address 009.

The operation of the queue control 600 for providing a new instruction to the data processor 100 is similar to that described hereinabove for the distributor memory 400 and will be outlined briefly below. For example, similar to the distributor memory 400 the detector circuit 106 forms a control signal at RQ*p* indicating that a current address contained in register 104 needs to be replaced with a new instruction. The signal at RQ*p* activates a time delay circuit 618. The time delay circuit 618 is identical to the time delay circuit 614 and will time out and cause a gate 628 to store the new instruction from the corresponding queue back into the register 104 of the data processor 100. The control signal at RQ*p* causes the gate 608 to store the current instruction into the X register 602. The control unit 604 then forms control signals at the outputs *ta*, *ta*1 and *ta*2 as described hereinabove, causing the top instruction of the corresponding queue to be stored into the X register 602 and then stored back into register 104 by the gate 628 with the head address modified to point at the next link address in the queue.

Consider now an operation of the queue control 600 wherein a new instruction is to be added to the corresponding queue by the program analyzer. For purposes of illustration it is assumed that the new instruction is a disk file instruction stored in the disk instruction register 516 of the program analyzer 500. The example shown in FIG. 6 should be followed in the following description.

Assume that the disk file instruction is DDD; —; — as shown in the disk instruction register 516 in FIG. 6. It will be noted that the queue, or the head and tail addresses, is not added to the instruction as yet. In the manner described above, the program analyzer 500 sends an angular position number to the random access address register 408 causing the content of the corresponding distributor memory location to be read out and stored into the information register 402. Assume that the distributor memory information register 102*a* now stores the current disk file instruction CCC; 001; 009 for execution. The signal generator 414 (FIG. 1) detects that there is a current instruction in the memory location in which the new disk file instruction is to be stored and forms a control signal at the SQ*d* output. This indicates that the corresponding slot or memory location of the distributor memory 404 has a current instruction waiting to be executed and therefore the new instruction contained in the disk instruction register 516 must be stored into the corresponding queue.

The control signal at SQ*d* activates the time delay circuit 616. The purpose of activating the time delay circuit 616 will be described in more detail but it is generally to cause a signal to be applied to gate 622 at the appropriate time so that the gate 622 will store an instruction placed into the X register 602 back into the information register 402. However, continuing with the operation of the queue control 600 in the sequence with which it operates a control signal at SQ*d* causes a gate 610 to store the disk file instruction contained in the distributor memory information register 102*a* into the X register 602. With reference to FIG. 6, it will be noted the X register 602 now contains the head address 001 and a tail address 009.

The control signal at SQ*d* activates the control unit 604. The control unit 604 now forms a control signal at the *tb* output circuit. The control signal at *tb* causes the tail address 009 contained in 602*c* to be stored into the address register 102*b* of the working memory.

The control signal at *tb* also causes a gate 631 to store the top address in the common list 700, address 005, into the tail address section 602*c* of the X register and in this manner, a new tail address is placed into the current instruction contained in the X register 602. The common list 700 then moves a new address to the top of the list which in this case is address 006, by way of example.

Subsequently, the control unit 604 forms a control signal at *tb*1 which causes the working memory 102 to read out the contents of address 009 and store the content into the information register 102*a*. For purposes of illustration, the content of register 102*a* is shown in FIG. 6 as EEE. It should be noted at this point that the instruction read out of the tail address 009 does not contain a link or tail address because it is the last instruction in the queue. However, a new tail address must now be placed therein.

To this end, the control unit 604 forms a control signal at *tb*2 which causes the gate 632 to store the new tail address 005, which is contained in 602*c*, into the address section of the information register 102*a* of working memory.

The control unit 604 then forms a control signal at *tb*3 which causes the instruction contained in the information register 102 with its new tail address to be stored back into location 009. At this point the queue has been modified so that it contains link address 005.

The new disk file instruction in the program analyzer must now be stored, and the current instruction with the new tail address must be stored back into the distributor memory 404. Subsequently, the control unit 604 forms a control signal at *tb*4 which causes the new tail address contained in section 602*c* of the X register to be stored into the address register 102*b* by the gate 630. A time delay circuit 638 is also activated by the signal SQ*d* and times out causing a signal in coincidence with the signal at *tb*4. This causes a gate 636 to store the new disk instruction DDD; —; — contained in the disk instruction register 516 of the program analyzer 500 into the information register 102*a*. Also, the time delay circuit 616 times out and applies a control signal to the gate 622 in coincident with the signal at *tb*4. This causes the gate 622 to store the current instruction with the new tail address contained in the X register 602 back into the distributor information register 402 for storage and subsequent execution.

The control unit 604 then forms a control signal at *tb*5 which causes the working memory 102 to store the new disk instruction contained in the disk instruction register 516 of the program analyzer into the working memory 102. At this point the working memory 102 contains the new disk instruction DDD; —; — at the new tail address 005 of the corresponding queue.

The operation of the queue control 600 wherein a new data processor instruction contained in the data processor register 106 is stored into a queue is quite similar to that described hereinabove for a new disk file instruction from the program analyzer 500. However, the current instruction is stored in register 104 by the data processor, and is transferred through a gate 612 into the X register 602. The new instruction is gated into the information register 102*a* from the register 106 by a gate 640 under control of *tb*4 and a time delay circuit 642. The time delay circuit 642 is initiated by the control signal at SQ*p*. After the current instruction has its tail address replaced by a new tail address in the X register 602, the gate 628 stores the data processor instruction from the X register 602 into the data processor register 104. Therefore, it can be seen that the operation of the queue control 600 when adding a new data processor instruction to a queue is quite similar to that already described in connection with the disk file instruction.

One special condition in the operation of the queue control 600 should be noted. This special condition occurs when a new instruction is first placed into a queue. Under these conditions the queue is being generated for the first time. Accordingly, there is no head address or tail address in the current instruction stored into the X register 602 by the gates 612 and 610. Therefore, it is necessary to place an available address into the head address section 602*b* of the X register and thereby identify a top or first address in a queue. It will be noted at this point that the head address and the tail address will be identical because there is only one instruction in the queue. A decoding circuit 642 is provided for detecting that the head address contained in section 602*b* does not contain a head address. The head address will only be all zeroes when the current instruction does not have an associated queue of instructions. The decoder 642 detects the zero condition of the head address in the X register 602 and applies a control signal to the gate 634. The gate 634 is responsive to the control signal from the decoder 642 and to a control signal from the *tb* output of the control unit 604 to store a new available address from the common list 520 into the head address section 602*b*. This is the same address stored into the tail address section 602*c* by the gate 632. Therefore, the head address and the tail address will be the same.

The control unit 604 is also responsive to the control signal from the decoder 642 indicating that the head address is all zeroes to skip from applying a control signal at *tb* to a control signal at *tb*4. The reason that *tb*1, *tb*2 and *tb*3 are skipped is that these cause the last instruction in the queue to be modified by adding a new tail address. Since there is no instruction in the queue, the link address is not added.

Although one preferred embodiment of the invention has been shown by way of example to illustrate the present invention, it should be understood that many rearrangements and modifications are possible within the scope of the present invention as defined in the following claims.

What is claimed is:

1. A multi-program data processing system comprising an addressable memory having a plurality of queues of instructions which are waiting to be executed, each of said instructions being stored in a separate memory location together with a link address, which serially links an instruction to another in the respective queue; data processing means for executing a current instruction which includes a tail address of a queue; means for adding an instruction to a queue including means for selectively addressing said memory with the tail address of one of said current instructions causing a last instruction in the corresponding queue to be read out and then rewritten; means for placing a new address into said last instruction which is rewritten into memory, and means for receiving and writing a new instruction into the memory location identified by said new address and thereby add said new instruction to the end of the corresponding queue, and means for replacing the tail address in said current instruction with said new address.

2. A multi-program data processing system as defined in claim 1 wherein said data processing apparatus includes cyclical storage apparatus having cyclically available storage positions and a memory therefor having a memory location for each of said storage positions in which instructions are stored for control of reading and writing in said cyclical storage means and means for providing new instructions for storage in preselected ones of said storage locations and means for causing a new instruction to be coupled to said new instruction receiving means when the preselected storage position for such instruction contains an instruction yet to be executed.

3. A multi-program data processing system as defined in claim 1 including cyclical storage apparatus having memory means for storing instructions for control of reading and writing therein and apparatus for providing cyclical storage instructions to said cyclical storage apparatus memory means for control of reading and writing and for providing data processor instructions to said data processor for execution, and means for sensing that a new instruction cannot be executed by either the cyclical storage means or the data processor because a current instruction is to be executed first for causing the new instruction receiving means to receive a new instruction from the instruction providing apparatus or the data processor.

4. A multi-program data processing system comprising an addressable memory having a plurality of queues of instructions which are waiting to be executed, each of said instructions being stored in a separate memory location together with a link address, which serially links an instruction to another in the respective queue; data processing means for executing a current instruction which includes a head address and a tail address of a queue; means for providing a new current instruction to the executing means comprising means for selectively addressing said memory with the head address of said current instruction causing the top instruction and associated link address in the corresponding queue to be read out; means for combining the top instruction and the associated link address which are read from said memory with the tail address of said current instruction to form a new current instruction for execution.

5. A multi-program data processing system as defined in claim 4 wherein said means for providing new current instructions comprises a register for storing the tail address of a current instruction from the executing means, and means for storing the top instruction and associated tail address which are read from said memory into said register, said register thereby containing the new current instruction for execution.

6. A multi-program data processing system as defined in claim 5 wherein said instruction executing means comprises a register for storing a current instruction which needs replacing, and means for storing a current instruction stored in the executing means register into the register of said new instruction providing means and means for storing a new current instruction formed in the register of said new instruction providing means back into the register of said executing means.

7. A multi-program data processing system comprising an addressable memory having a plurality of queues of instructions which are waiting to be executed, each of said instructions being stored in a separate memory location together with a link address, which serially links an instruction to another in the respective queue; data processing means for executing instructions including a register for storing an instruction currently to be executed together with a head address identifying the address of the first instruction in a queue and a second register for storing a new instruction to be executed; means for selectively addressing said memory with the tail address of the stored current instruction causing the last instruction in the corresponding queue to be read out and then rewritten, means for providing a series of available new addresses, means for placing one of said new addresses into said current instruction in place of the tail address and for placing such one new address into said last instruction before it is rewritten into said memory causing such instruction to be rewritten with such one new address, and means for writing said new instruction into the memory location identified by said one new address and thereby add said new instruction to the end of the corresponding queue.

8. In a data processing system having apparatus for executing multiple programs, the combination comprising an addressable memory having a plurality of queues of instructions which are waiting to be executed, each of said instructions being stored in a separate memory location together with a link address, which serially links one instruction to another in the respective queue; data processing apparatus including a first register for storing instructions, one by one, which are currently being executed, each instruction including a head address and a tail address identifying respectively, the addresses of the first and the last of a corresponding queue in said memory, and a second register for storing a new instruction to be executed; a third register, means for storing a current instruction contained in said first register into said third register, gating means for coupling the tail address of the current instruction contained in said third register to said memory causing the last instruction in the corresponding queue to be read out and then to be rewritten into the tail address, means for providing a series of available memory addresses, gating means for storing at least one available memory address into said third register in place of the existing tail address including gating means for coupling said at least one available memory address to said memory before said last instruction is rewritten causing said at least one available address to be stored with such last instruction and identify a new tail address, and gating means for coupling said at least one available address to said memory together with the new instruction contained in said second register causing the new instruction to be stored into such new address and thereby be added to the instructions in the corresponding queue, further gating means for coupling the head address of an instruction contained in said third register to said memory means causing the top instruction in the corresponding queue to be read out and further gating means for storing such top instruction into said third register to combine the same with the tail address in said third register and thereby form a new current instruction for the data processing apparatus and timing means for selectively activating said gating means when a new instruction is to be added to a queue and for separately activating said further gating means when a current instruction has been used and a new instruction is needed from the corresponding queue.

9. A multi-program data processing system comprising memory means storing a plurality of queues of instructions having addresses therein linking said instructions from a first to a last instruction in the corresponding queue and means for adding a new instruction to a queue including means for providing an address for a new end of queue instruction, means for storing a new instruction into said address and means for storing said address into the previous end of queue instruction thereby providing a link to the new end of queue instruction.

10. In a data processing system comprising cyclical storage means having sequentially available storage positions, first memory means having a storage location for each of said storage positions for storing an instruction for control of the accessing of the corresponding storage position, second memory means for storing a queue of instructions waiting to be executed for each of said storage positions, said instructions having associated therewith link addresses linking said instructions from a first to a last instruction in the corresponding queue, storage means for the address of the first instruction in a corresponding queue and means for obtaining the instruction in said stored first instruction address and for providing same to the first memory means for storage in the corresponding storage location.

11. In a data processing system as defined in claim 10 including means for reading out an instruction and the associated link address from a storage location of said first memory means as the corresponding storage position becomes available for accessing.

12. In a data processing system as defined in claim 11 including means for coupling the link address readout of the first memory means to the address storage means for storage and use in obtaining the next instruction from the corresponding queue.

References Cited

UNITED STATES PATENTS

| | | | |
|---|---|---|---|
| 3,297,999 | 1/1967 | Shimabukuro. | |
| 3,387,283 | 6/1968 | Snedaker | 340—172.5 |
| 3,387,277 | 6/1968 | Singer et al. | 340—172.5 |
| 3,351,909 | 11/1967 | Hummel | 340—172.5 |
| 3,341,817 | 9/1967 | Smeltzer | 340—172.5 |
| 3,333,251 | 7/1967 | Brenza et al. | 340—172.5 |
| 3,332,070 | 7/1967 | Lucas et al. | 340—172.5 |

GARETH D. SHAW, Primary Examiner